US011869263B2

(12) United States Patent
Shorter et al.

(10) Patent No.: US 11,869,263 B2
(45) Date of Patent: *Jan. 9, 2024

(54) AUTOMATED CLASSIFICATION AND INTERPRETATION OF LIFE SCIENCE DOCUMENTS

(71) Applicant: IQVIA Inc., Durham, NC (US)

(72) Inventors: Gary Shorter, Danbury, CT (US);
Barry Ahrens, Danbury, CT (US)

(73) Assignee: IQVIA Inc., Durham, NC (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/746,233

(22) Filed: May 17, 2022

(65) Prior Publication Data

US 2022/0277576 A1 Sep. 1, 2022

Related U.S. Application Data

(63) Continuation of application No. 17/070,533, filed on Oct. 14, 2020, now Pat. No. 11,373,423, which is a
(Continued)

(51) Int. Cl.
*G06V 30/412* (2022.01)
*G06F 40/279* (2020.01)
(Continued)

(52) U.S. Cl.
CPC .......... *G06V 30/412* (2022.01); *G06F 40/279* (2020.01); *G06F 40/30* (2020.01);
(Continued)

(58) Field of Classification Search
CPC ... G06F 40/279; G06F 40/30; G06V 2201/09; G06V 2201/10; G06V 30/10;
(Continued)

(56) References Cited

U.S. PATENT DOCUMENTS 8,724,907 B1 * 5/2014 Sampson ............ G06F 18/2433
382/209
9,311,568 B1 4/2016 Feller
(Continued)

OTHER PUBLICATIONS

Extended European Search Report dated Feb. 10, 2023 issued in connection with corresponding EP Patent Application No. 22176682.7 (18 pages total).
(Continued)

*Primary Examiner* — Manuchehr Rahmjoo
(74) *Attorney, Agent, or Firm* — Stevens & Lee PC; John Maldjian, Esq.; David L. D'Amato, Esq.

(57) ABSTRACT

A computer-implemented tool for automated classification and interpretation of documents, such as life science documents supporting clinical trials, is configured to perform a combination of raw text, document construct, and image analyses to enhance classification accuracy by enabling a more comprehensive machine-based understanding of document content. The combination of analyses provides context for classification by leveraging relative spatial relationships among text and image elements, identifying characteristics and formatting of elements, and extracting additional metadata from the documents as compared to conventional automated classification tools.

19 Claims, 16 Drawing Sheets

Related U.S. Application Data continuation of application No. 16/289,729, filed on Mar. 1, 2019, now Pat. No. 10,839,205.

(51) Int. Cl.
| | |
|---|---|
| *G06F 40/30* | (2020.01) |
| *G06V 30/413* | (2022.01) |
| *G06V 30/414* | (2022.01) |
| *G06V 30/196* | (2022.01) |
| *G06V 30/10* | (2022.01) |
| *G06V 30/32* | (2022.01) |

(52) U.S. Cl.
CPC ........ *G06V 30/1983* (2022.01); *G06V 30/413* (2022.01); *G06V 30/414* (2022.01); *G06V 30/10* (2022.01); *G06V 30/32* (2022.01); *G06V 2201/09* (2022.01); *G06V 2201/10* (2022.01)

(58) Field of Classification Search
CPC .. G06V 30/1983; G06V 30/32; G06V 30/412; G06V 30/413; G06V 30/414
See application file for complete search history.

(56) References Cited

U.S. PATENT DOCUMENTS

| | | |
|---|---|---|
| 10,839,164 B1 | 11/2020 | Shorter et al. |
| 2017/0206409 A1 | 7/2017 | Bataller et al. |
| 2018/0300315 A1 | 10/2018 | Leal et al. |
| 2018/0330202 A1 | 11/2018 | Blanchflower et al. |
| 2018/0357207 A1 | 12/2018 | Yi et al. |
| 2020/0279108 A1 | 9/2020 | Shorter et al. |
| 2021/0034855 A1 | 2/2021 | Shorter et al. |
| 2021/0089764 A1 | 3/2021 | Shorter et al. |

OTHER PUBLICATIONS

Partial European Search Report dated Nov. 2, 2022 issued in connection with corresponding EP Patent Application No. 22176682.7 (14 pages total).

Extended European Search Report dated Sep. 10, 2020, issued in connection with corresponding European Patent Application No. 20160213.3 (9 Pages total).

Extended European Search Report dated Apr. 21, 2022, issued in connection with corresponding European Patent Application No. 21212117.2 (10 Pages total).

\* cited by examiner

*FIG 5*

| Clinical Study Protocol | Final, 22 September |
|---|---|
| SYNOPSIS | IQVIA |
| Name of Sponsor/Company: | |
| Title of Study: | |
| Study Number: | |
| Study Phase: 3 | |
| Objectives: Primary: • | |
| Secondary: • • • | |
| Tertiary: • | |

IQVIA™ and what it means to be in a study. The study medication has been designed to impact the cells in If you have any questions about the study, you should ask your doctor and your parent(s)/person(s) taking care of you.

Please read this form and talk to your mom, dad or person taking care of you before you decide. They will also be asked if you can be in the study. You cannot be in the study if your mom, dad or person taking care of you doesn't agree. They will be asked to sign a form allowing you to be in the study. If you don't want to be in the study you will not upset anyone. Even if your mom, dad, or person taking care of you says "YES", you can still say "NO". You will still be looked after by the doctors and nurses even if you don't want to take part. Before you decide, you need to know more about the new medicine and what will happen so you can ask questions.

A description of this clinical trial will be available on the Internet http://www.ClinicalTrials.gov, as required by U.S. Law and/or on https://www.clinicaltrialsregister.eu as required by E.U. Law. This/These website(s) will not include information that can identify you. At most, this/these website(s) will include information about clinical trials such as their purpose, who may participate, locations, contact information, and the summary of the results. You can search the website(s) at any time, if you wish. This/these website(s) is/are written in the English language.

When the results of the study are available, you will be given a chance to receive them.

2. PROCEDURES

Signature: _____ Date: 10-24-18

— 605

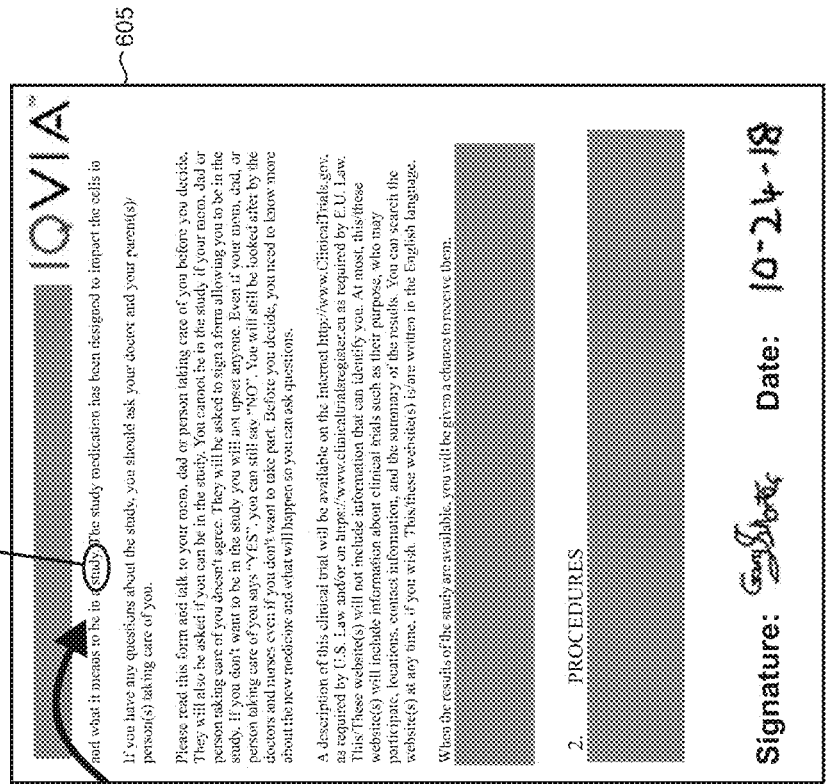
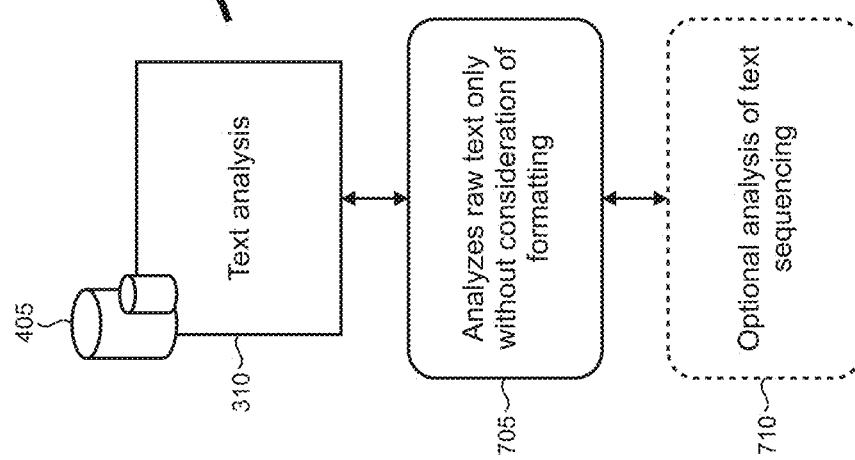
FIG 7

AUTOMATED CLASSIFICATION AND INTERPRETATION OF LIFE SCIENCE DOCUMENTS

CROSS REFERENCE TO RELATED APPLICATIONS

This application is a continuation of U.S. Ser. No. 17/070,533 filed Oct. 14, 2020, entitled, "AUTOMATED CLASSIFICATION AND INTERPRETATION OF LIFE SCIENCE DOCUMENTS", which is a continuation of U.S. Ser. No. 16/289,729 filed Mar. 1, 2019, entitled, "AUTOMATED CLASSIFICATION AND INTERPRETATION OF LIFE SCIENCE DOCUMENTS", now U.S. Pat. No. 10,839,205, which are incorporated herein by reference in their entirety.

BACKGROUND

Automated classification is typically utilized to effectively manage text, images, and unstructured information in documents. Also referred to as categorization, clustering, or text classification, automated classification generally enables documents to be divided and organized based on a set of predefined categories or classes for rapid and easy retrieval of information.

SUMMARY

A computer-implemented tool for automated classification and interpretation of documents, such as life science documents supporting clinical trials, is configured to perform a combination of text, document construct, and image analyses to enhance classification accuracy by enabling a more comprehensive machine-based understanding of document content. The combination of analyses provides context for classification by leveraging spatial relationships among text and image elements, identifying characteristics and formatting of elements, and extracting additional metadata from the documents as compared to conventional automated classification tools.

The text analysis identifies raw text and its general location in a document. Text sequence can be optionally tracked in some implementations. The document construct analysis provides the automated classification and interpretation tool with additional understanding of the document by identifying relevant context such as spatial construct information (e.g., position of images on a page, location of text in headers, footers, titles, use of rows and columns in tables, etc.) and formatting (e.g., bold, italics, font, text size, etc.). The document construct analysis may also maintain connections among document elements by tracking text that neighbors document elements on either side. The image analysis is directed to graphical content such as logos, diagrams, charts and tables, captions, and the like to extract additional context to further deepen the machine-based understanding of the document.

Although text analysis may be utilized alone with satisfactory results in some limited classification implementations, the construct and image analyses are ordinarily not configured to operate individually for document classification. However, the combination of the three analyses provides an improvement in classification accuracy by operating synergistically to assist in disambiguation between document classes which can be numerous and subtly distinct in some cases. The combination of analyses enables document classes to be differentiated by providing additional meaning using the identified relevant context. This enables document text that would otherwise be ambiguous to be effectively utilized for classification purposes.

In various illustrative examples, the automated classification and interpretation tool is configured to apply machine learning to an artificial intelligence (AI) engine that is trained with historical classified documents. The AI engine may be accessed by the tool or be incorporated in whole or part into the tool, and utilized to implement the combined text, document construct, and image analyses in whole or part. The analysis algorithms are subject to adjustments from a human operator through a user interface (UI) that is exposed on the automated classification and interpretation tool. The adjustments can be used to improve the automated document classification and interpretation and may be used as a machine learning input to improve performance of the classification and interpretation tool in general.

The computing device supporting the automated classification and interpretation tool can incorporate an image capture device such as a camera or scanner or be configured to interoperate with a discrete image capture device that is used to digitize life science documents. The tool can be operated in the field to apply the text, document construct, and image analyses to provide real-time classification feedback for the captured documents to the human operator. The real-time classification feedback may include suggested classification for the captured documents as well as associated metadata in some implementations. The operator can review the suggested document classification and metadata and provide approval or corrections through the UI. Corrections can be used as machine learning inputs to enhance the accuracy of the automated classification and interpretation tool.

The present computer-implemented automated classification and interpretation tool provides improvements in the underlying operation of the computing device on which it executes by providing for increased classification accuracy. More specifically, the utilization of a combination of raw text, document construct, and image analyses enables efficient utilization of processing cycles, memory requirements, and network bandwidth by improving the machine's knowledge depth to produce more accurate classification to thereby reduce a need to perform manual reclassification or discard inaccurate classification results. The automated classification and interpretation tool may further enhance the efficiency of the human-machine interface on the computing device because the tool more accurately classifies life science documents which improves the effectiveness of subsequent computer-assisted document searches and retrievals.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 5 and 6 show illustrative life science documents that may be classified in a TMF;

FIG. 7 shows illustrative operational details of a text analysis process;

Like reference numerals indicate like elements in the drawings. Elements are not drawn to scale unless otherwise indicated.

DETAILED DESCRIPTION

Figure 1:
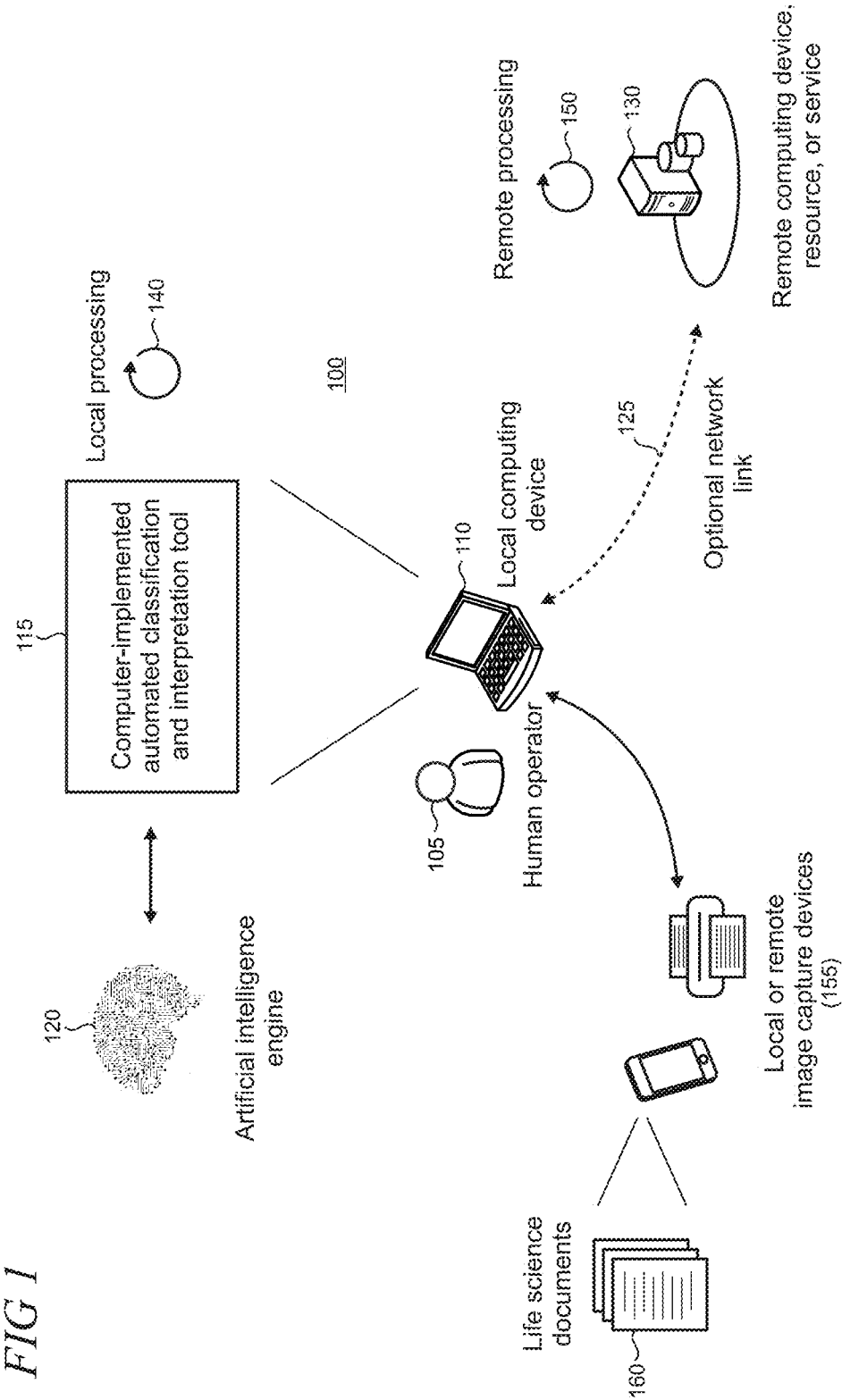
FIG. 1 shows an illustrative computing environment in which a computer-implemented automated classification and interpretation tool executes on a computing device.

FIG. 1 shows an illustrative computing environment 100 in which a human operator 105 employs a computing device 110 that is configured to support a computer-implemented automated classification and interpretation tool 115. The tool may be implemented, for example, as a software application that executes on the computing device. In alternative implementations, the automated classification and interpretation tool may be implemented using hardware, firmware, or a combination thereof depending on the needs of a particular implementation of the present automated classification and interpretation of life science documents. The automated classification and interpretation tool can interface with, or incorporate directly, an artificial intelligence (AI) engine 120 that may be implemented, for example, using a neural or deep-learning network, expert system, or other suitable system that is configured for machine learning.

The computing device 110 comprises an electronic device such as a personal computer, server, handheld device, workstation, multimedia console, smartphone, tablet computer, laptop computer, or the like. In the discussion that follows, the use of the term "computing device" is intended to cover all electronic devices that perform some computing operations, whether they be implemented locally, remotely, or by a combination of local and remote operation.

The automated classification and interpretation tool 115 may be configured to optionally communicate over a network link 125 with a remote computing device, resource, or service 130. While this illustrative example employs processing at the local computing device 110 (as indicated by reference numeral 140), it is noted that other processing allocations and arrangements may also be utilized. For example, the automated classification and interpretation tool may be instantiated as a remote or cloud-based application. Various combinations of local processing 140 and remote processing (as indicated by reference numeral 150) can be implemented as appropriate for a given automated classification and interpretation tool implementation.

The communications network link 125 can be implemented using any of a variety of network types and network infrastructure in various combinations or sub-combinations including local-area networks (LANs), wide-area networks (WANs), cellular networks, satellite networks, IP (Internet-Protocol) networks such as Wi-Fi under IEEE 802.11 and Ethernet networks under IEEE 802.3, a public switched telephone network (PSTN), and/or short range networks such as Bluetooth® networks. Network infrastructure can be supported, for example, by mobile operators, enterprises, Internet service providers (ISPs), telephone service providers, data service providers, and the like. The communications network link 125 may utilize portions of the Internet (not shown) or include interfaces that support a connection to the Internet so that the computing device 110 can access data or content and/or render user experiences supported by the remote service provider and/or other service providers (not shown).

Various image capture devices 155 can be utilized in the computing environment to capture images of life science documents that are deconstructed as described below. The image capture devices can be standalone devices such as cameras or scanners or be incorporated into other computing devices 110. The image capture devices can be deployed locally or remotely. For example, images can be captured at a remote worksite and transmitted to the local computing device 110 or be transmitted to a cloud-based storage service and then accessed by the computing device over a network link. Alternatively, the computing device and image capture device may be co-located.

Figure 2:
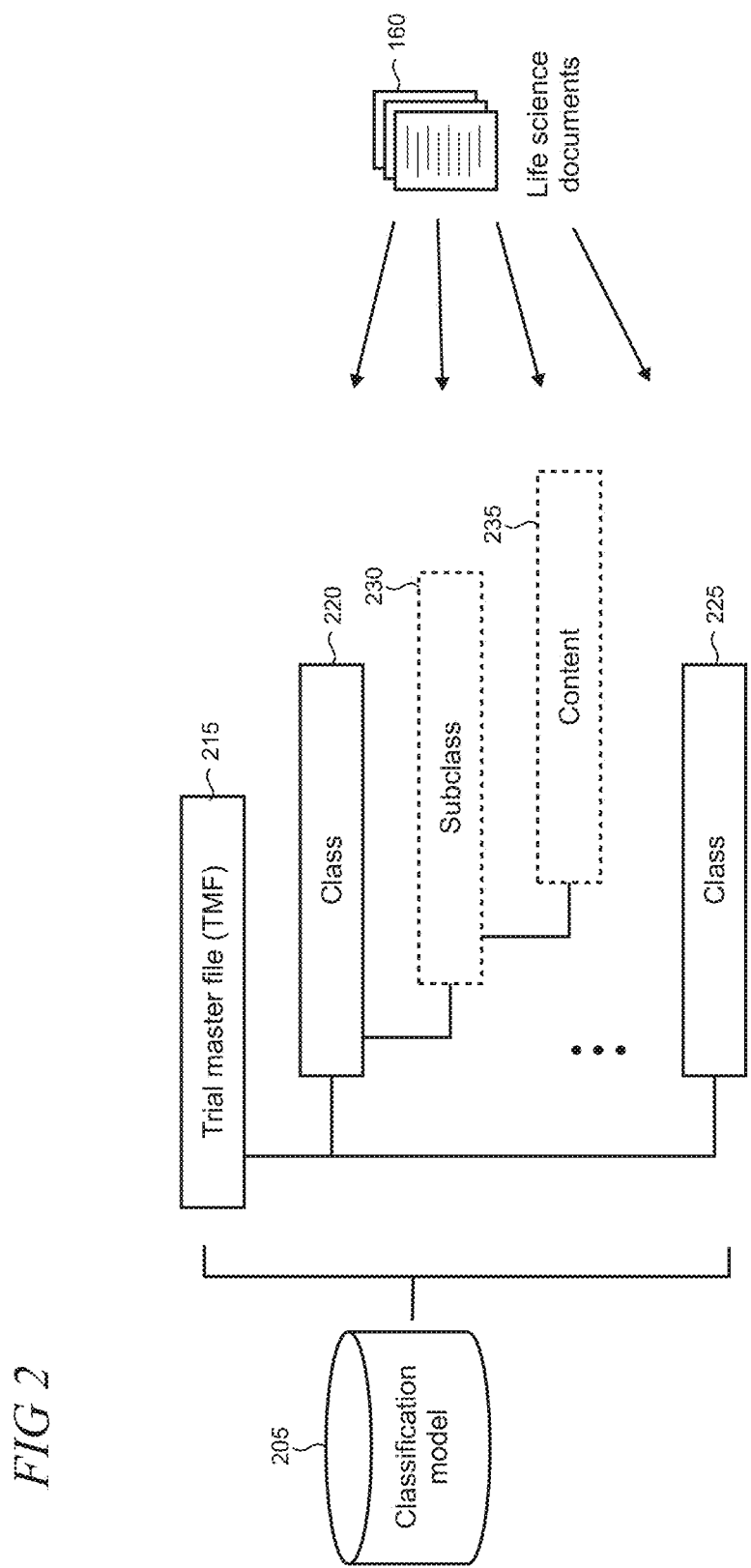
FIG. 2 shows an illustrative classification model under which life science documents are classified as part of a trial master file (TMF)

FIG. 2 shows an illustrative classification model 205 under which life science documents 160 may be classified as part of a trial master file (TMF) 215. The life science industry typically needs to comply with requirements of regulatory agencies in their oversight of the design, conduct, recording, and reporting of clinical trials. The TMF is examined by inspectors to demonstrate the compliance of the sponsor, trial monitor, and the investigators with applicable standards and regulatory requirements. The TMF is the collection of life science documents that typically permits evaluation of the compliance of the clinical trial and the quality produced. It is noted that the term "life science document" has general applicability to the documents that are typically collected in the TMF.

The TMF 215 is organized with different categories or classes of life science documents 220 . . . 225. In some implementations, various subclasses 230 and content 235 may also be included in the TMF or utilized in classification systems other than those which use a TMF. The TMF may be organized to include categories or classes as defined by the Drug Information Association (DIA) in some cases.

Figure 3:
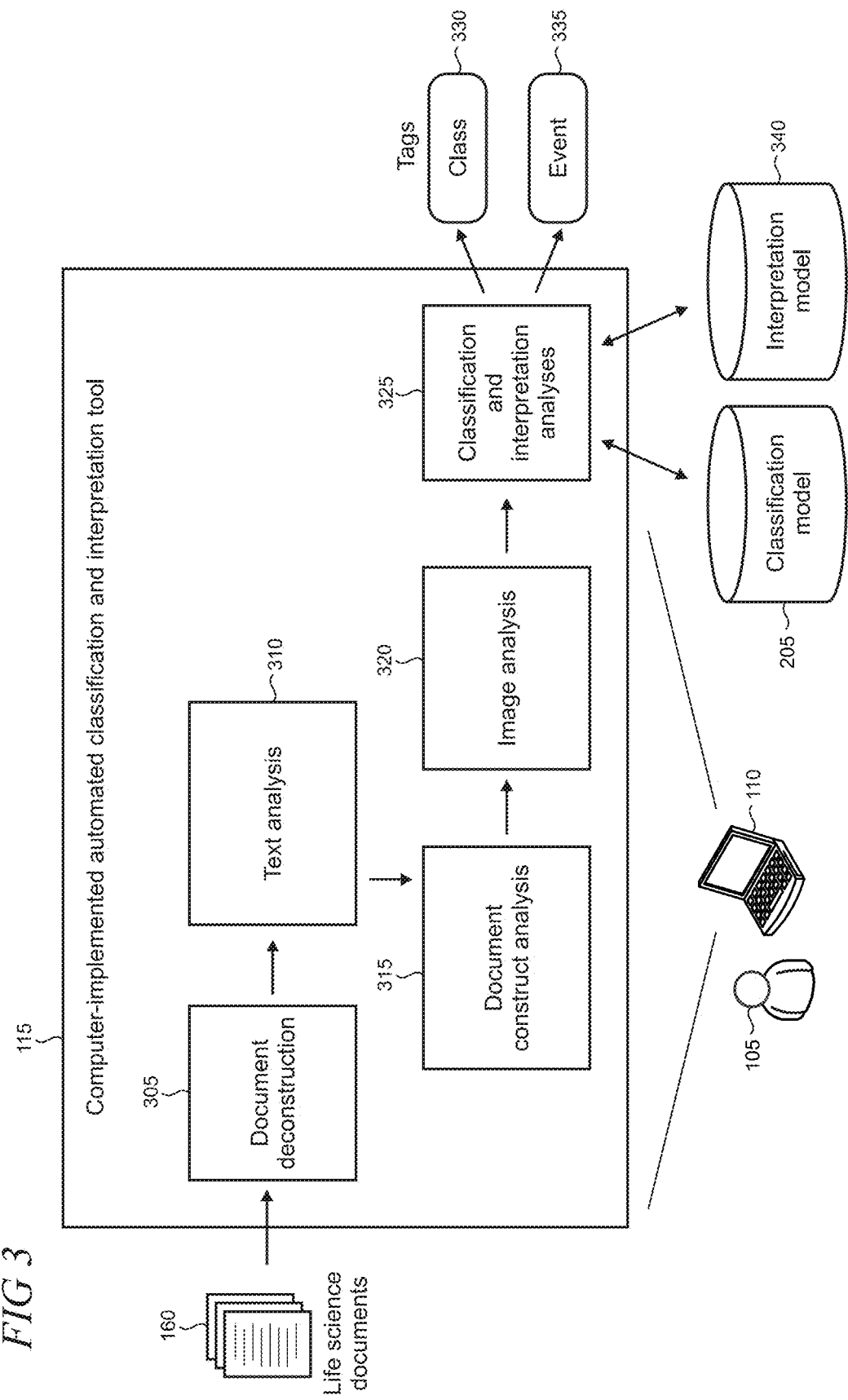
FIG. 3 shows illustrative details of the computer-implemented automated classification and interpretation tool that executes on a computing device.

FIG. 3 shows illustrative details of the computer-implemented automated classification and interpretation tool 115 that executes on the computing device 110. The inputs to the tool include the life science documents 160 and the outputs from the tool include a class tag 330 and event tag 335 that are respectively applicable to each of the documents 160. The class tag identifies the class 220 . . . 225 (or subclass or content as appropriate) into which the life science is classified by operation of the tool. The event tag identifies objects in the documents that the tool interprets as having significance for events, actions, and/or triggers. For example, the event tag may identify document content that pertains to issues of safety, regulatory factors, data management, and other information that is associated with the content of the document.

The computer-implemented automated classification and interpretation tool 115 includes functionalities configured for document deconstruction 305, text analysis 310, document construct analysis 315, image analysis 320, and classification and interpretation analyses 325. The classification and interpretation analyses are supported by the classification model 205 and an interpretation model 340 which may be implemented as part of the tool 115 or be externally implemented as databases or resources on other computing devices.

Document deconstruction 305 includes converting the captured life science documents 160 to a digitized form that uses a standardized data structure across all documents that is expressed for example using XML (eXtensible Markup Language) or other suitable representation. The quality of the source materials may be expected to vary widely in typical implementations. Thus, the document deconstruction can apply various techniques to accommodate noise and unwanted artifacts during digitization to improve quality of the input to the automated classification and interpretation tool 115. In some cases, relevant descriptive information such as metadata can be collected for the input life science documents and stored. Such information may be used, for example, for TMF management and other purposes.

Figure 4:
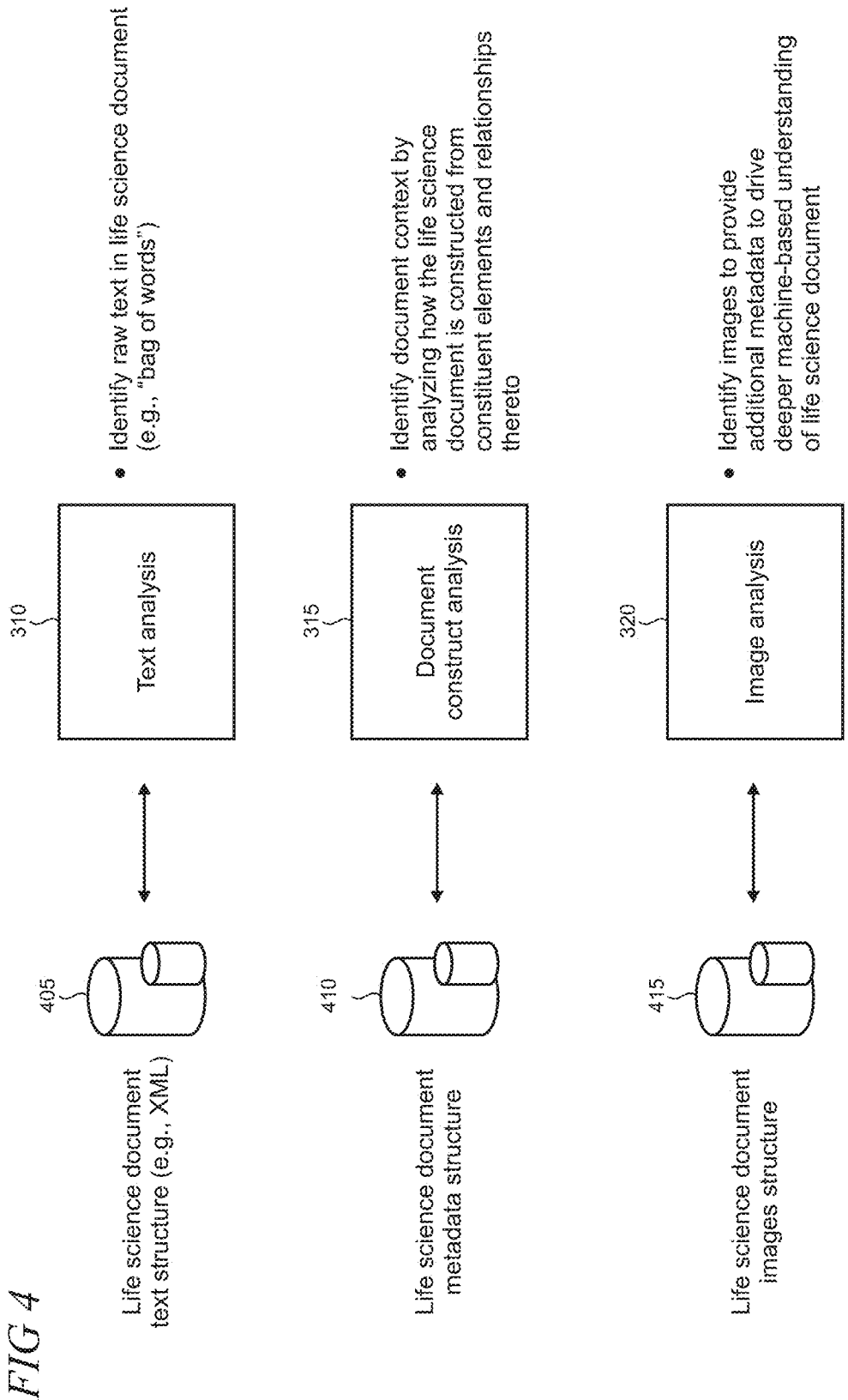
FIG. 4 shows illustrative data structures associated with analyses that are applied in combination during operation of the computer-implemented automated classification and interpretation tool.

FIG. 4 shows illustrative data structures that are respectively associated with the text, document construct, and image analyses that are applied in combination during operation of the computer-implemented automated classification and interpretation tool 115. A life science document text structure 405 supports the text analysis 310 to enable raw text to be identified from the life science documents 160 (FIG. 1), typically without regard to sequence context (i.e., using a "bag of words" approach). However, text sequence can be tracked and utilized in some implementations of the tool.

A life science document base metadata structure 410 supports the document construct analysis 315 to enable utilization of document context such as spatial construct information for document elements (e.g., position of images on a page, location of text in headers, footers, titles, use of rows and columns in tables, etc.) and formatting (e.g., bold, italics, font, text size, etc.). The document construct analysis may also maintain connections among document elements by tracking text that neighbors document elements on either side. A document images structure 415 supports the image analysis 320 to enable graphical content such as logos, diagrams, charts and tables, captions, and the like to extract additional context to further deepen the machine-based understanding of the life science documents.

An illustrative example of an application of the text, document construct, and image analyses to life science documents is now presented. FIGS. 5 and 6 show illustrative life science documents that may be classified in a TMF. FIG. 5 shows an illustrative protocol synopsis 505 and FIG. 6 shows an illustrative informed assent form 605. Details that are not pertinent to the presentation of the example have been redacted from the life science documents 505 and 605. The documents in this example are classified differently under DIA guidance, however each document has similar text content including the word "study." The discussion that follows illustrates how the present computer-implemented automated classification and interpretation tool and application of the combination of text, document construct, and image analyses enables the disambiguation and accurate classification of the documents.

As shown in FIG. 7, the text analysis 310 includes an analysis of the raw text without consideration of formatting (as indicated by reference numeral 705). As noted above, text sequence may be optionally utilized (710) to provide additional context in some implementations. Here, for example, the text analysis identifies the word "study" is included in the informed assent document 605.

Figure 8:
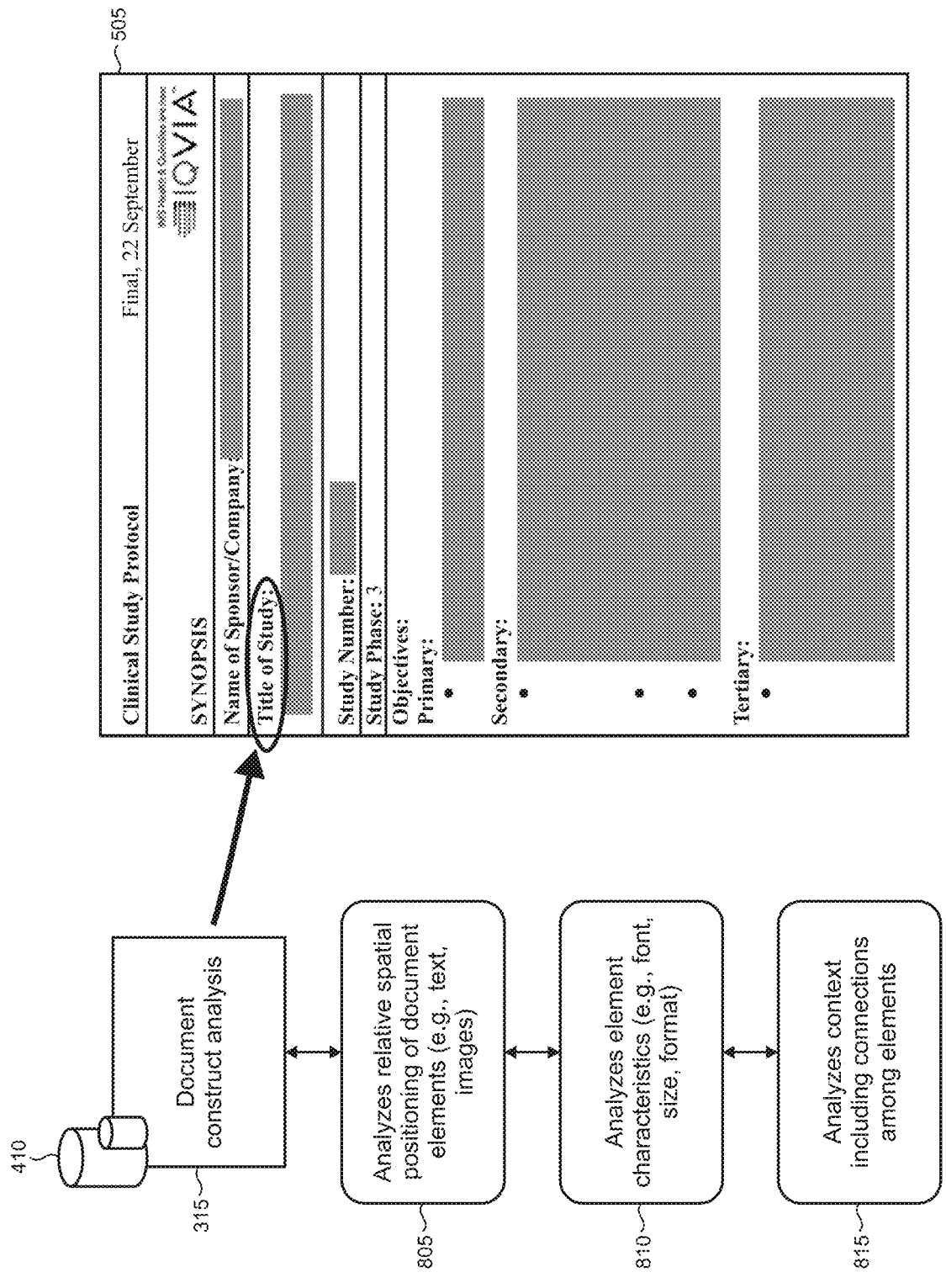
FIG. 8 shows illustrative operational details of a construct analysis process.

As shown in FIG. 8, the document construct analysis 315 includes analyzing the relative spatial position of document elements (805) such as text and images. Element characteristics are also analyzed (810) including text font, size, and format (e.g., bold, italics, underline, subscript, superscript, etc.). Context connections may also be analyzed (815) using, for example, the "nearest neighbor" concept, by keeping the connected location of the element in relation to the text information occurring just before and just after. Such content connection allows for an understanding of the relevance of a document element (e.g. image) in relation to its position within the document.

In this example, the document construct analysis 315 identifies the word "study" in the protocol synopsis document 505 as being at the top of the first page of the document with a bold font. The document construct analysis 315 further identifies that the document construction includes the word being in a cell of a table with neighboring text of "Title of Study." Such characteristics constitute metadata that provides additional context that enables the computer-implemented automated classification and interpretation tool to gain deeper understanding of the protocol synopsis document 505 to thereby disambiguate it from the informed assent document 605 (FIG. 6).

Figure 9:
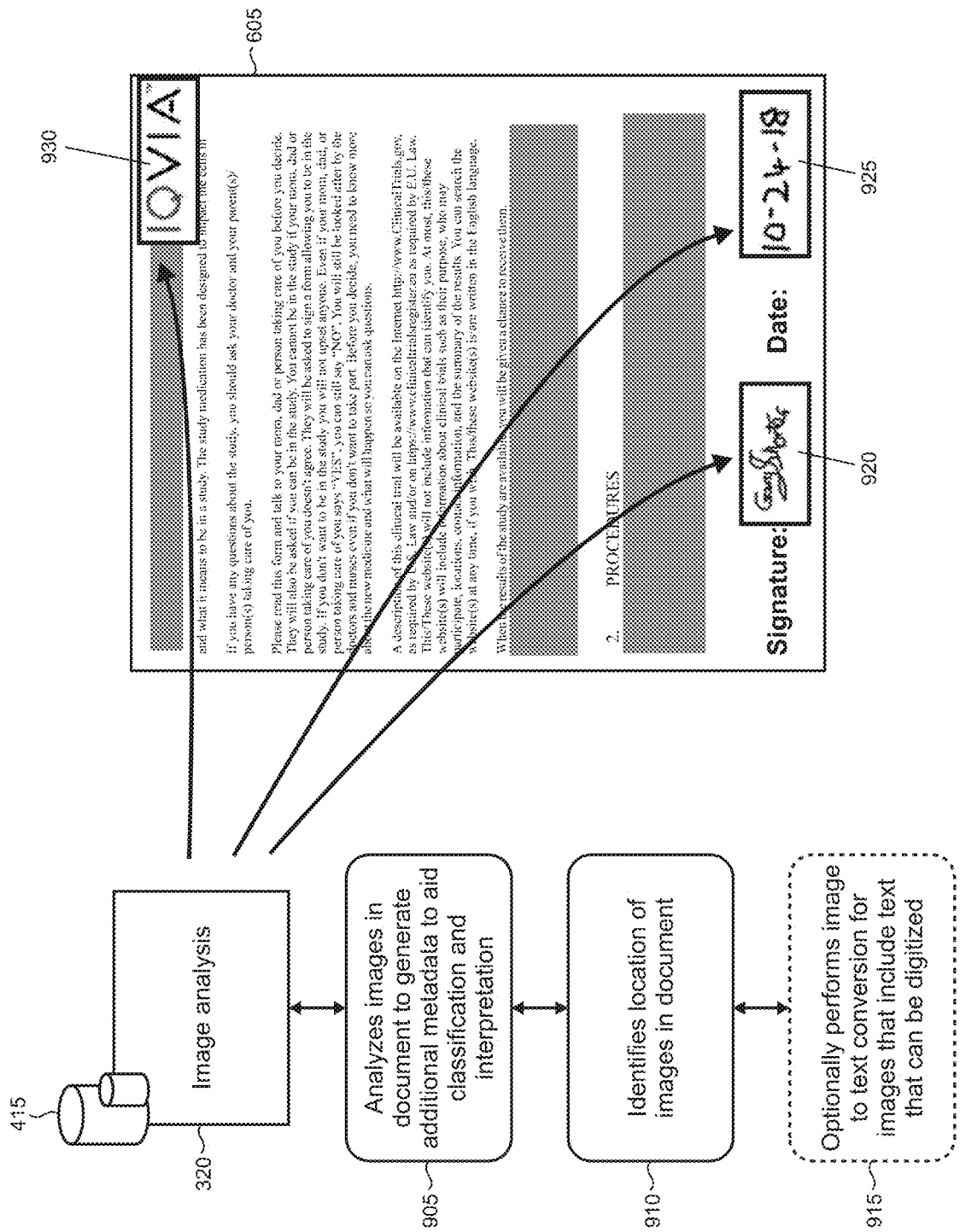
FIG. 9 shows illustrative operational details of an image analysis process.

As shown in FIG. 9, the image analysis 320 includes analyzing images in the document to generate additional metadata to aid document classification and interpretation (905). Location of the images in the document may also be identified (910). In some implementations, image to text conversions may be applied (915) to create digitization of text elements that may be included in the images. In this example, the image analysis identifies a hand written "wet ink" signature 920 and date 925 to verify that the informed assent document is signed. In some cases, the signature and date can be converted to digital representations. The image analysis may also facilitate understanding of the graphical company logo 930 to enable further understanding of an entity that owns the document.

Figure 10:
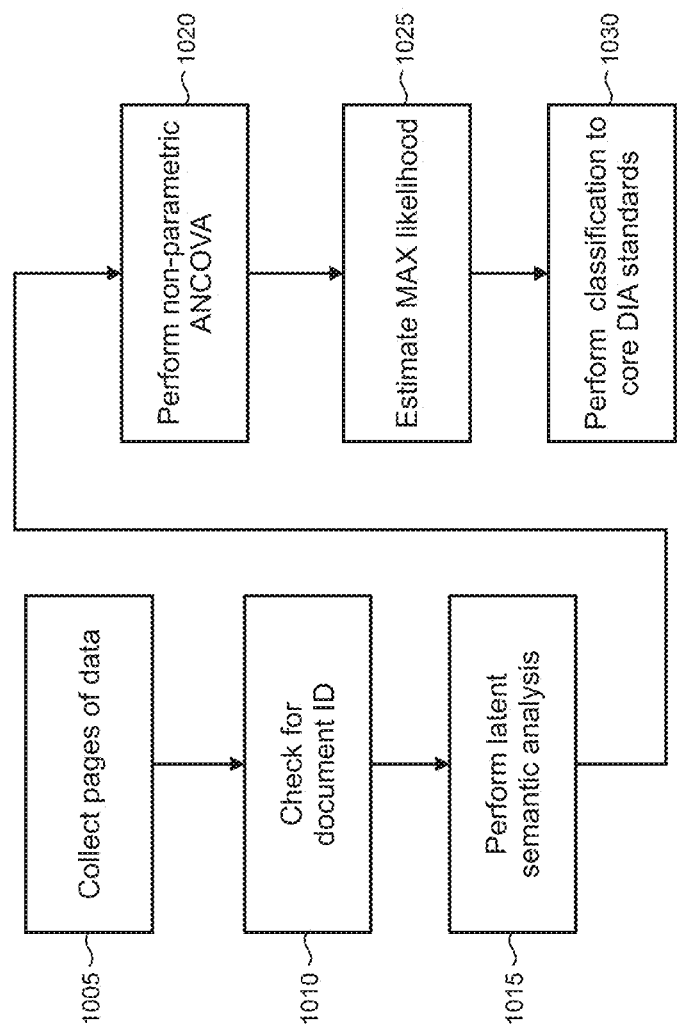
FIG. 10 is a flowchart showing an illustrative classification process.

FIG. 10 is a flowchart showing an illustrative classification process that may be used as part of the classification and interpretation analyses 325 (FIG. 3). In step 1005, relevant pages of the life science document of interest are collected. Document identification (ID) is checked at step 1010. In step 1015, latent semantic analysis (LSA) is performed which may weight document characteristics (e.g., bold text, header location, logo, etc.) for relevance. The LSA results are collated into a non-parametric analysis of covariance (ANCOVA) in step 1020. A maximum likelihood estimate is performed in step 1025, and the document is classified in step 1030, for example to core DIA standards.

Figure 11:
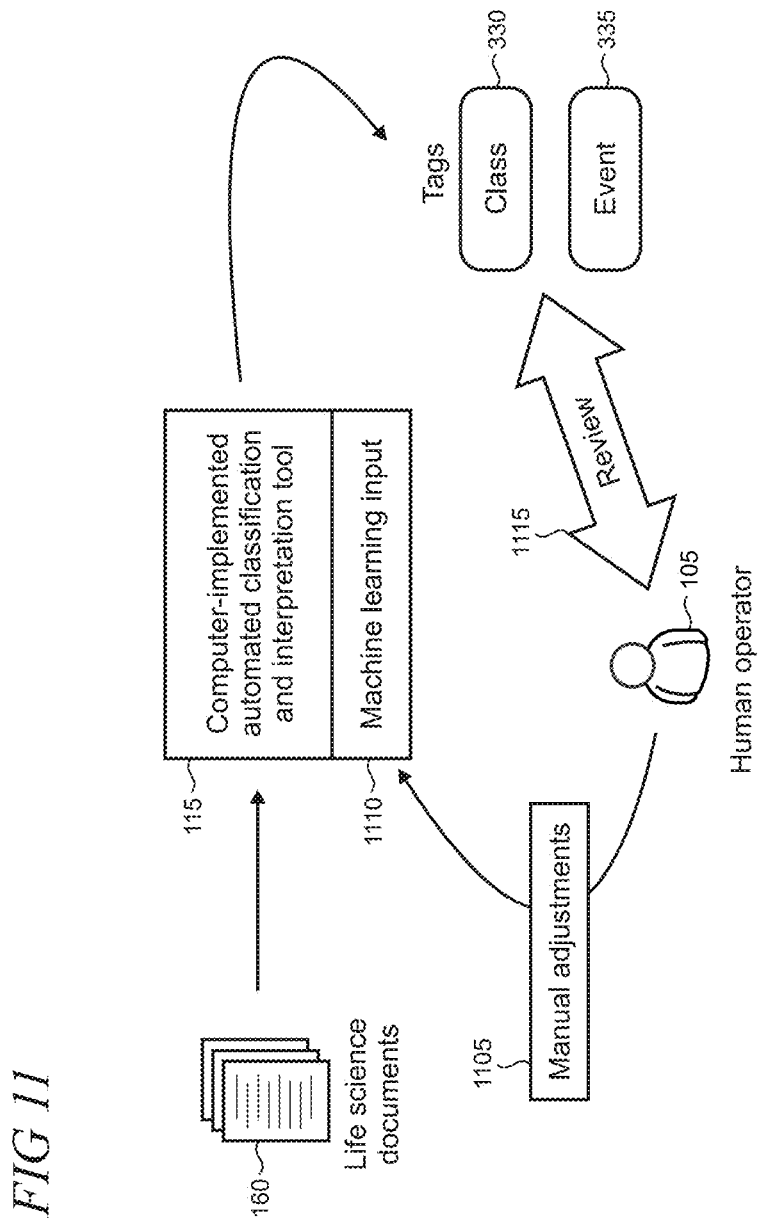
FIG. 11 shows illustrative manual adjustments to processes operating on the computer-implemented automated classification and interpretation tool that may be utilized as machine learning input.

FIG. 11 shows illustrative manual adjustments 1105 to the various text, document construct, and image analyses operating on the computer-implemented automated classification and interpretation tool 115 (FIG. 1) that may be utilized as machine learning input 1110. In this example, the human operator 105 can perform a review 1115 of the class and event tags 330 and 335 that are output from the tool. The operator may adjust document classification that the automated classification and interpretation tool can analyze to make appropriate changes in the underlying automated analyses. Alternatively, the operator may directly adjust the analyses themselves to achieve a desired outcome. In some cases, the operator may perform multiple adjustment iterations to assist the machine learning process by specifying different classification outcomes, or by varying processing parameters with each iteration.

Figure 12:
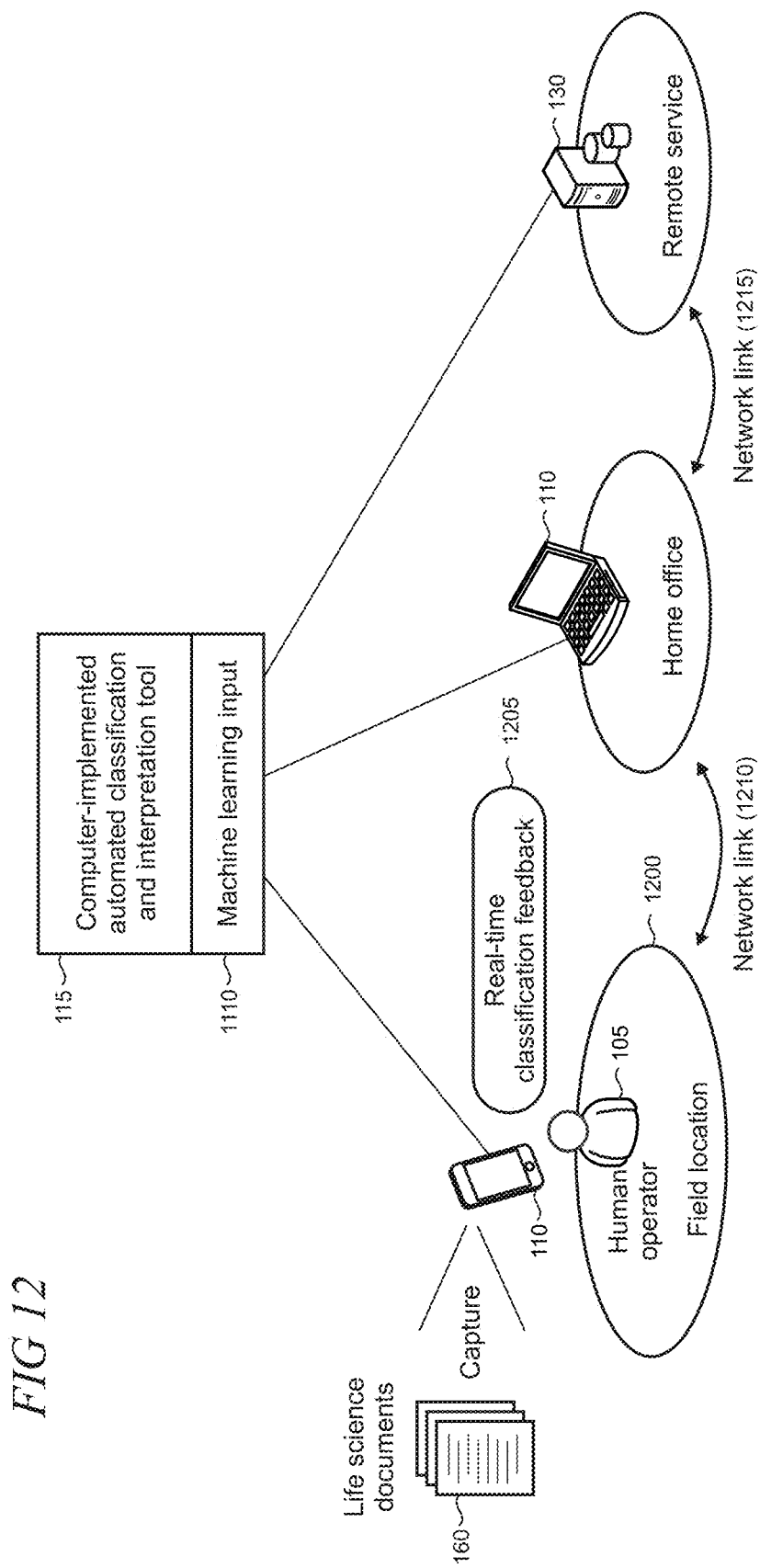
FIG. 12 shows illustrative real-time classification feedback provided by the automated classification and interpretation tool to a human operator.

FIG. 12 shows illustrative real-time classification feedback 1205 provided by the automated classification and interpretation tool 115 to a human operator 105. In this example, the tool may be separately instantiated on a portable computing device 110 that includes an image capture device such as an integrated camera. The device 110 can thus be operated in a field location 1200 that is co-located, for example, with the life science document 160. Alternatively, the automated classification and interpretation tool may be partially supported by a computing device 110 that is located back at a home office or corporate enterprise and/or using a remote service 130 in a cloud-computing configuration that uses various network links 1210 and 1215 to establish communication and interoperability among the computing elements.

The automated classification and interpretation tool 115 can be operated in the field location 1200 to rapidly apply the text, document construct, and image analyses 310, 315, and 320 to provide real-time classification feedback 1205 for the captured documents to the human operator 105. The real-time classification feedback may include suggested classification for the captured documents as well as associated metadata in some implementations. The operator can review the suggested document classification and metadata and provide approval or corrections through the UI that is exposed on the tool. Corrections can be used as machine learning inputs 1110 to enhance the accuracy of the automated classification and interpretation tool.

Figure 13:
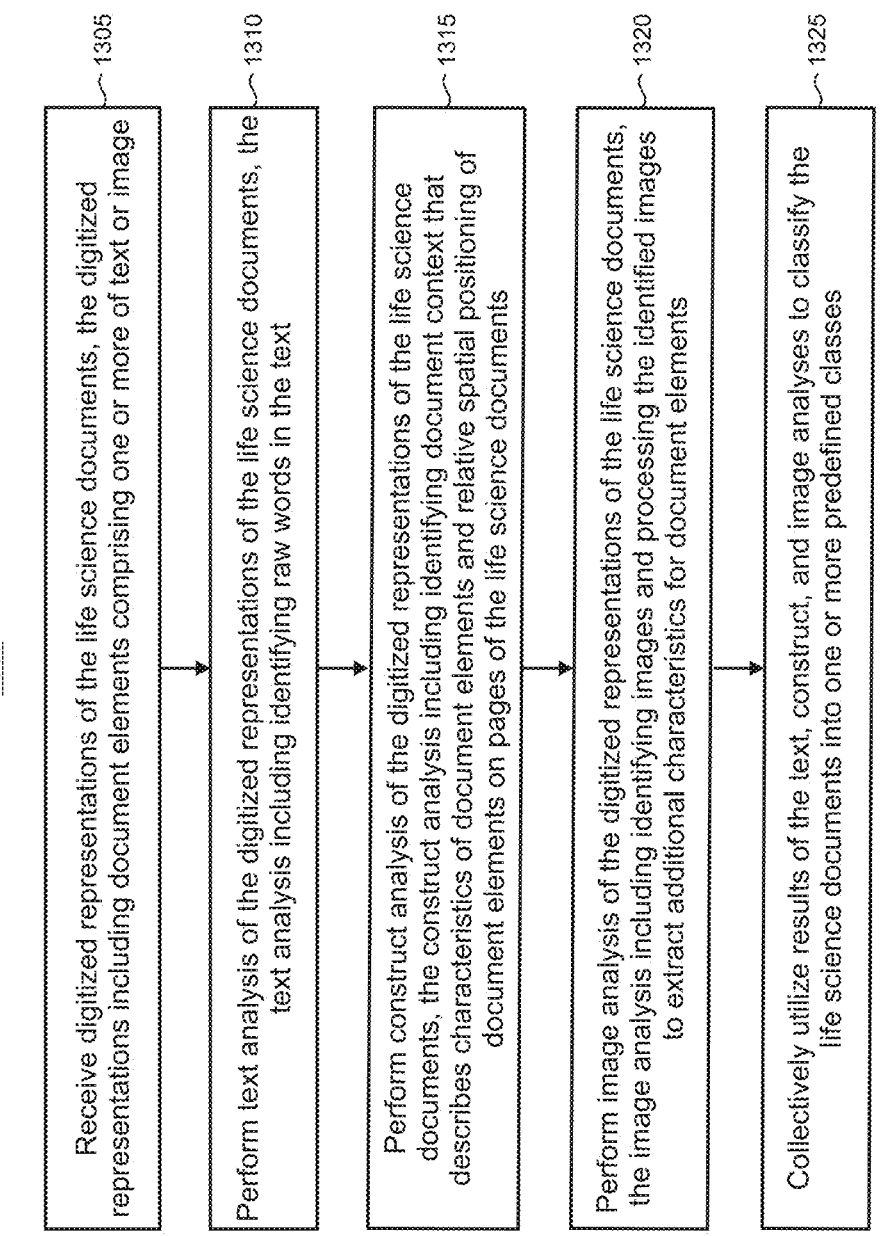
FIGS. 13, 14, and 15 show illustrative methods.
Figure 14:
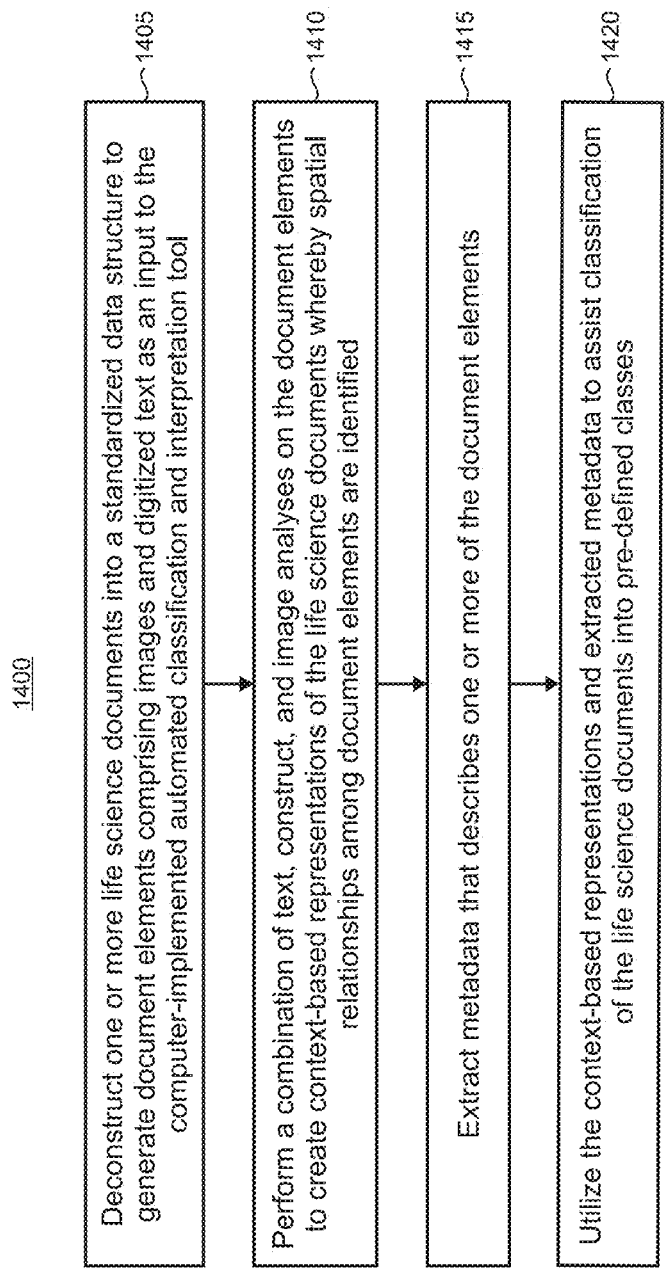
Figure 15:
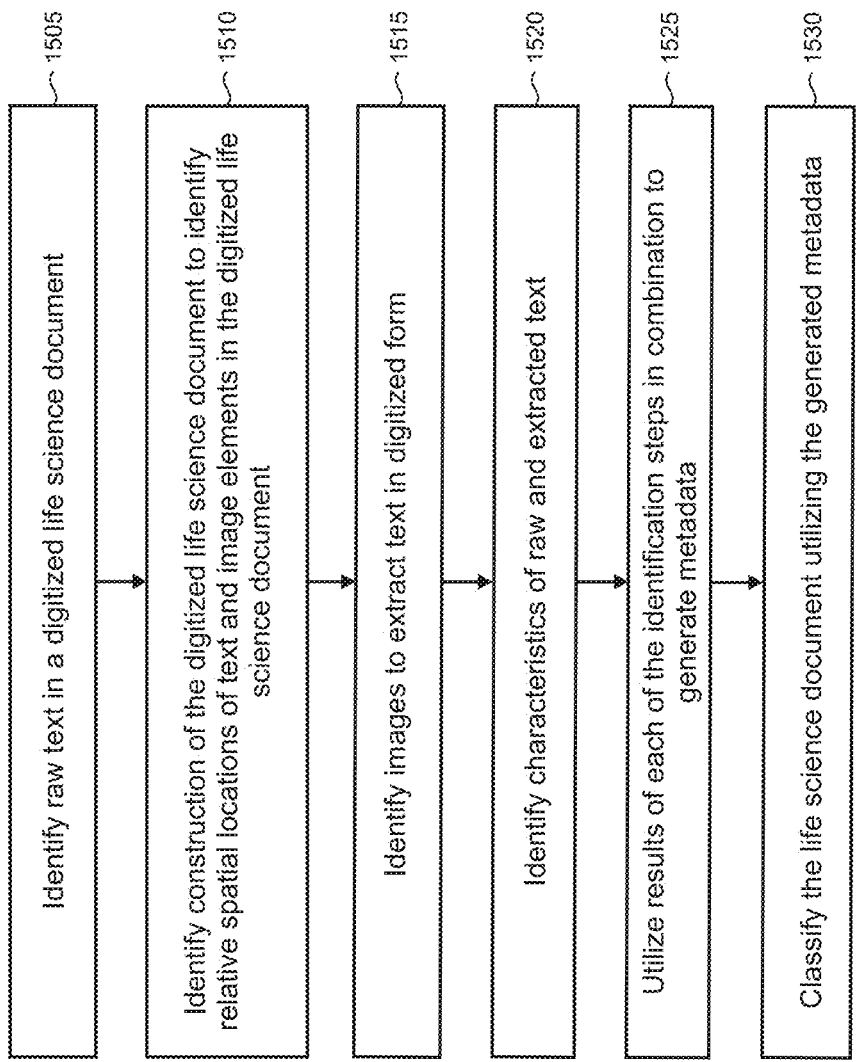

FIGS. 13, 14, and 15 show illustrative methods for automated classification of life science documents. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

FIG. 13 is a flowchart of an illustrative method 1300 that may be performed by a computing device that supports the automated classification and interpretation tool 115 (FIG. 1). In step 1305, the device receives digitized representations of the life science documents, the digitized representations including document elements comprising one or more of text or image. In step 1310, the device performs text analysis of the digitized representations of the life science documents, the text analysis including identifying raw words in the text. In step 1315, the device performs construct analysis of the digitized representations of the life science documents, the construct analysis including identifying document context that describes characteristics of document elements and relative spatial positioning of document elements on pages of the life science documents. In step 1320, the device performs image analysis of the digitized representations of the life science documents, the image analysis including identifying images and processing the identified images to extract additional characteristics for document elements. In step 1325, the device collectively utilizes results of the text, construct, and image analyses to classify the life science documents into one or more predefined classes.

FIG. 14 is a flowchart of an illustrative method 1400 that may be performed by a computing device that supports the automated classification and interpretation tool 115 (FIG. 1). In step 1405, the device deconstructs one or more life science documents into a standardized data structure to generate document elements comprising images and digitized text as an input to the computer-implemented automated classification and interpretation tool. In step 1410, the device performs a combination of text, construct, and image analyses on the document elements to create context-based representations of the life science documents whereby spatial relationships among document elements are identified. In step 1415, the device extracts metadata that describes one or more of the document elements. In step 1420, the device utilizes the context-based representations and extracted metadata to assist classification of the life science documents into pre-defined classes.

FIG. 15 is a flowchart of an illustrative method 1500 that may be performed by a computing device that supports the automated classification and interpretation tool 115 (FIG. 1). In step 1505, the device identifies raw text in a digitized life science document. In step 1510, the device identifies construction of the digitized life science document to identify relative spatial locations of text and image elements in the digitized life science document. In step 1515, the device identifies images to extract text in digitized form. In step 1520, the device identifies characteristics of raw and extracted text. In step 1525, the device utilizes results of each of the identification steps in combination to generate metadata. In step 1530 the device classifies the life science document utilizing the generated metadata.

Figure 16:
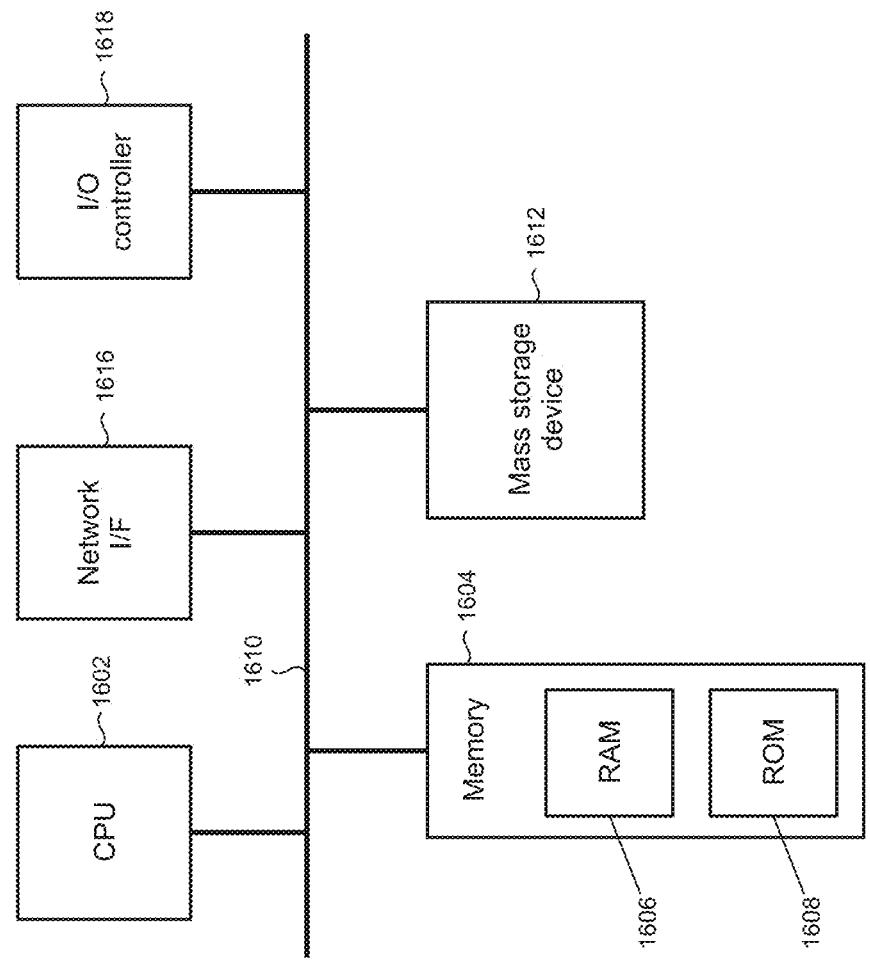
FIG. 16 is a block diagram of an illustrative computing device that may be used at least in part to implement the present automated classification and interpretation of life science documents.

FIG. 16 shows an illustrative architecture 1600 for a device, such as a server, capable of executing the various components described herein for the present automated classification and interpretation of life science documents. The architecture 1600 illustrated in FIG. 16 includes one or more processors 1602 (e.g., central processing unit, dedicated artificial intelligence chip, graphic processing unit, etc.), a system memory 1604, including RAM (random access memory) 1606 and ROM (read only memory) 1608, and a system bus 1610 that operatively and functionally couples the components in the architecture 1600. A basic input/output system containing the basic routines that help to transfer information between elements within the architecture 1600, such as during startup, is typically stored in the ROM 1608. The architecture 1600 further includes a mass storage device 1612 for storing software code or other computer-executed code that is utilized to implement applications, the file system, and the operating system. The mass storage device 1612 is connected to the processor 1602 through a mass storage controller (not shown) connected to the bus 1610. The mass storage device 1612 and its associated computer-readable storage media provide non-volatile storage for the architecture 1600. Although the description of computer-readable storage media contained herein refers to a mass storage device, such as a hard disk, solid state drive, or optical drive, it may be appreciated that computer-readable storage media can be any available storage media that can be accessed by the architecture 1600.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1600.

According to various embodiments, the architecture 1600 may operate in a networked environment using logical connections to remote computers through a network. The architecture 1600 may connect to the network through a network interface unit 1616 connected to the bus 1610. It may be appreciated that the network interface unit 1616 also may be utilized to connect to other types of networks and remote computer systems. The architecture 1600 also may include an input/output controller 1618 for receiving and processing input from several other devices, including a keyboard, mouse, touchpad, touchscreen, control devices such as buttons and switches or electronic stylus (not shown in FIG. 16). Similarly, the input/output controller 1618 may provide output to a display screen, user interface, a printer, or other type of output device (also not shown in FIG. 16).

It may be appreciated that the software components described herein may, when loaded into the processor 1602 and executed, transform the processor 1602 and the overall architecture 1600 from a general-purpose computing system into a special-purpose computing system customized to facilitate the functionality presented herein. The processor 1602 may be constructed from any number of transistors or other discrete circuit elements, which may individually or collectively assume any number of states. More specifically, the processor 1602 may operate as a finite-state machine, in response to executable instructions contained within the software modules disclosed herein. These computer-executable instructions may transform the processor 1602 by specifying how the processor 1602 transitions between states, thereby transforming the transistors or other discrete hardware elements constituting the processor 1602.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1600 in order to store and execute the software components presented herein. It also may be appreciated that the architecture 1600 may include other types of computing devices, including wearable devices, handheld computers, embedded computer systems, smartphones, PDAs, and other types of computing devices known to those skilled in the art. It is also contemplated that the architecture 1600 may not include all of the components shown in FIG. 16, may include other components that are not explicitly shown in FIG. 16, or may utilize an architecture completely different from that shown in FIG. 16.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A computer-implemented method for classifying and interpreting one or more documents, the method comprising:
   receiving a digitized representation of the one or more documents that include information on life sciences, text, and images;
   analyzing the text for each of the one or more documents to identify one or more root words within the text;
   performing a construct analysis for each of the one or more documents after the text analysis is performed to identify document elements and spatial positioning of the document elements in the one or more documents, wherein performing the construct analysis for each of the one or more documents comprises analyzing the text, analyzing the images, and analyzing context connections of each of the one or more documents;
   classifying each of the one or more documents into at least one predefined class based on the analyzed text and construct analysis; and
   tagging each of the one or more documents with a class tag to identify the least one predefined class and an event tag to identify one or more events within the one or more documents.

2. The computer-implemented method of claim 1, wherein analyzing the images of each of the one or more documents comprises identifying one or more images and extracting characteristics from the images.

3. The computer-implemented method of claim 1, wherein the image analysis is utilized along with the analyzed text and the construct analysis to classify the one or more documents into the predefined classes.

4. The computer-implemented method of claim 1, wherein analyzing the text for each of the one or more documents comprises analyzing one or more words of the respective document.

5. The computer-implemented method of claim 1, further comprising:

creating context-based representations of the one or more documents after the text and construct analysis to identify spatial relationships among the document elements.

6. The computer-implemented method of claim 1, further comprising:
creating context-based representations of the one or more documents after the text and construct analysis to enable the classification of the one or more documents into the predefined classes.

7. A computer program product comprising a tangible non-transitory storage medium encoded with processor-readable instructions that, when executed by one or more processors, enable the computer program product to:
receive a digitized representation of one or more documents that include information on life sciences, text, and images;
analyze the text for each of the one or more documents to identify one or more root words within the text;
perform a construct analysis for each of the one or more documents after the text analysis is performed to identify document elements and spatial positioning of the document elements in the one or more documents, wherein performing the construct analysis for each of the one or more documents comprises analyzing the text, analyzing the images, and analyzing context connections of each of the one or more documents;
classify each of the one or more documents into at least one predefined class based on the analyzed text and construct analysis; and
tag each of the one or more documents with a class tag to identify the least one predefined class and an event tag to identify one or more events within the one or more documents.

8. The computer program product of claim 7, wherein the one or more documents include one or more triggers.

9. The computer program product of claim 7, wherein the event tag identifies significant events within the one or more documents.

10. The computer program product of claim 7, wherein analyzing the images comprises identifying one or more images and extracting characteristics from the one or more images.

11. The computer program product of claim 7, wherein construct analysis for each of the one or more documents includes analyzing element characteristics including text font, text size, and format of the respective document.

12. The computer program product of claim 7, wherein analyzing the text for each of the one or more documents comprises analyzing one or more text sequences within the document elements of the respective document.

13. The computer program product of claim 7, wherein context-based representations are created after the text analysis and construct analysis to enable the one or more documents to be classified into the pre-defined classes.

14. A computer system connected to a network, the system comprising:
one or more processors configured to:
receive a digitized representation of one or more documents that include information on life sciences, text, and images;
analyze the text for each of the one or more documents to identify one or more root words within the text;
perform a construct analysis for each of the one or more documents after the text analysis is performed to identify document elements and spatial positioning of the document elements in the one or more documents, wherein performing the construct analysis for each of the one or more documents comprises analyzing the text, analyzing the images, and analyzing context connections of each of the one or more documents;
classify each of the one or more documents into at least one predefined class based on the analyzed text and construct analysis; and
tag each of the one or more documents with a class tag to identify the least one predefined class and an event tag to identify one or more events within the one or more documents.

15. The computer system of claim 1, wherein the event tag identifies one or more triggers within the one or more documents.

16. The computer system of claim 14, wherein document deconstruction is performed on the one or more documents to accommodate noise and unwanted artifacts to enable the one or more documents to be converted into the digitized representation and be received as the digitized representation.

17. The computing system of claim 14, wherein the construct analysis for each of the one or more documents includes analyzing context connections by identifying text information directly before and directly after at least one of the document elements in the respective document.

18. The computing system of claim 14, wherein analyzing the text for each of the one or more documents comprises analyzing at least one key word among the identified root words in the respective document.

19. The computing system of claim 14, wherein the construct analysis analyzes the spatial positioning of the document elements in the one or more documents that is used to generate metadata to enable the one or more documents to be classified into the predefined classes.

* * * * *